United States Patent Office 2,971,962
Patented Feb. 14, 1961

1

2,971,962

METHOD OF MAKING THE LACTONE OF 2-HYDROXYBIPHENYL-2'-CARBOXYLIC ACID

John O. Hawthorne, Pittsburgh, and Myron H. Wilt, Monroeville, Pa., assignors to United States Steel Corporation, a corporation of New Jersey No Drawing. Filed Jan. 22, 1959, Ser. No. 788,253

3 Claims. (Cl. 260—343.2)

This invention relates to a method for making the lactone of 2-hydroxybiphenyl-2'-carboxylic acid and, in particular, to a method using a starting material which is readily available at reasonable cost, and giving a good yield.

The above mentioned lactone has been made by various methods but all those with which we are familiar give only a low yield or require expensive reactants. The compound is useful as a rodent repellent and as a stabilizer in plastics. Our invention involves treating orthophenylphenol with sodium hydroxide to produce sodium orthophenylphenate. This salt is treated with phosgene to convert it to ortho-biphenylyl chloroformate. The latter is reacted with aluminum chloride to produce the lactone.

A complete understanding of the invention may be gained from the following detailed explanation of a preferred practice thereof.

In a three-necked, 300-ml., round-bottom flask, 17.0 g. (0.1 mole) o-phenylphenol, 4.3 g. (0.15 mole) sodium hydroxide, and 100 ml. water were refluxed until the o-phenylphenol was in solution. Sodium chloride (2.0 g.) was added to depress the freezing point and the solution was cooled to −5° C. Phosgene was admitted into the solution through a sintered-glass gas-dispersion tube, for about 20 minutes (until the pH changed from 12 to 1). The resulting aqueous suspension of solid material was frozen and the water removed by freeze-drying.

The dry solid thus produced was dissolved in a solution of 0.10 to 0.20 mole, preferably 0.11 mole or 14.6 g. anhydrous aluminum chloride in about 50 ml. anhydrous thiophene-free benzene. This mixture was stirred for three hours at 25° C. and then poured into 125 ml. hydrochloric acid (1 part concentrated acid, 4 parts water, concentration not critical) and sufficient ice to bring the temperature of the acid solution below room temperature. The benzene layer was separated and washed with about 50 ml. of the acid solution, then with water until acid-free. The benzene was dried over anhydrous calcium chloride and then evaporated. The residue was washed with 2½% sodium hydroxide solution (40 to 80 ml., preferably 60 ml.), leaving 10.1 g. crude product melting at 78 to 85° C. Recrystallization from 145 to 155 ml. n-heptane gave 7.6 g. of the lactone of 2-hydroxybiphenyl-2'-carboxylic acid melting at 89 to 91° C. The yield was 38.8%.

The initial reaction temperature is critical and should not be permitted to rise above −5° C., since further reaction of the intermediate o-biphenylyl chloroformate becomes more dominant. The AlCl₃ reaction is effected at room temperature and the time can be two to three hours.

Either sodium o-phenylphenate dissolved in water or o-phenylphenol dissolved in aqueous alkali may be used as the starting material. Other solvents which may be used for the aluminum chloride treatment instead of benzene are nitrobenzene or carbon disulfide. Substituted o-phenylphenols may be treated as disclosed to produce the corresponding substituted lactone.

The reactions occurring in the described procedure are:

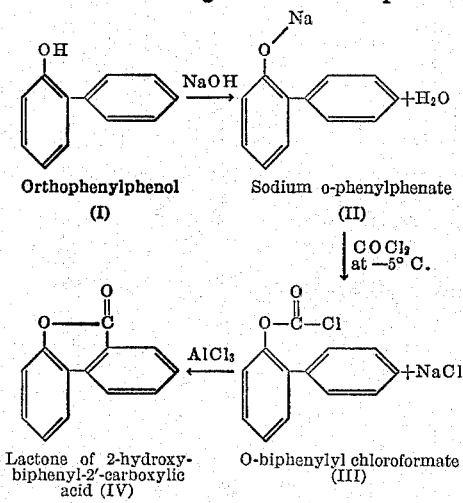

Orthophenylphenol (I)   Sodium o-phenylphenate (II)

Lactone of 2-hydroxy-biphenyl-2'-carboxylic acid (IV)   O-biphenylyl chloroformate (III)

The lactone is applied or compounded by a variety of methods to or with any material which is attacked by rodents or is deteriorated by light or both, so that damage from these sources is decreased or prevented. Packaging material, such as wooden or paper boxes and paper, fiber or plastic bags, growing crops, building materials, synthetic or natural fibrous materials, dyes, paints, lacquers, waxes and plastics are included as articles that may be treated.

Application may be as a dust composed of 10% of the compound and 90% of an inert material (e.g., clay) or as a liquid composed of a 10% solution in an organic solvent (e.g., acetone, alcohol, aromatic hydrocarbon, etc.) which is useful for spraying brushing or rolling. The compound may be dissolved in the organic solvents usually employed in formulating paints and lacquers. It may be dispersed in water with a surface-active agent or melted at the temperature of boiling water for application. The compound may be added to materials by the use of an aqueous solution of the ammonium salt of 2-hydroxy-2'-biphenylcarboxylic acid. Heating the impregnated material at 125° C. drives off water and ammonia to leave the lactone in the product. A material may be impregnated with an aqueous solution of the sodium salt of 2-hydroxy-2'-biphenylcarboxylic acid, and subsequent acidification will precipitate the lactone within the material. This compound may be incorporated in manufactured materials, such as paper, during their formation by, for example, adding it to the pulp during processing.

In surface-coating, the amount of the active compound to be applied may vary between 0.1 and 100 pounds per 1000 square feet of the surface to be protected; ordinarily the amount will be between 1 and 20 pounds, and the preferred range between 5 and 15 pounds. Expressed in terms of weight percent of the final product, the amount of the compound applied to the material should be between 0.05 and 20.0 weight percent; usually between 0.25 and 10 weight percent will be found appropriate, and the preferred range is between 0.5 and 5 weight percent.

The rodent repellency of the lactone is shown by the following tests. Rats were permitted to feed for four days on 20 grams of bait containing 2.0 weight percent of the compound and on an equal amount of untreated bait. Having eaten the untreated bait in little more than a day, the rats ate nothing during the remainder of the test period rather than touch the treated food. The compound was then tested at 0.5 weight percent concentration in bait and found to have essentially the same activity as at the 2.0 weight percent level.

The lactone, dissolved in acetone was applied to burlap bags at a concentration of 5.0 mg./sq. in. and tested with individually-caged house mice against untreated control bags. There was a 52% reduction in damage of the treated bags over the untreated.

To show the light stabilization given to plastic material by the lactone, 1" x 3" glass microscope slides were coated with clear polyvinyl chloride lacquer samples containing the following materials (concentration based on the solid content of the lacquer):

(1) No additive.
(2) 0.25 weight percent 2-hydroxy-4-methoxybenzophenone.
(3) 1.0 weight percent phenyl salicylate.
(4) 0.5 weight percent phenyl salicylate.
(5) 1.0 weight percent the lactone.
(6) 0.5 weight percent the lactone.
(7) 0.25 weight percent the lactone.

The slides with their uniform lacquer coating were baked at 110° C. for 30 minutes to give a film-coating of vinyl chloride. The test samples were then irradiated by ultraviolet radiation from mercury vapor sources for 7¼ hours. By visual inspection of the relative amount of yellow color present in the films as compared to the untreated film, the following order of increasing effectiveness was determined:

(1) 0.5 percent phenyl salicylate.
(2) 1.0 percent phenyl salicylate.
(3) 0.25 percent the lactone.
(4) 0.25 percent 2-hydroxy-4-methoxybenzophenone.
(5) 0.5 percent the lactone.
(6) 1.0 percent the lactone.

Further irradiation for 6¼ hours showed that the latter two concentrations of the lactone still gave the most protection. Thus, the compound gave better protection at a lower concentration than phenyl salicylate and, at higher concentrations, better protection than the 2-hydroxy-4-methoxybenzophenone.

Although we have disclosed herein the preferred practice of our invention, we intend to cover as well any change or modification therein which may be made without departing from the spirit and scope of the invention.

We claim:

1. A method of making the lactone of 2-hydroxybiphenyl-2'-carboxylic acid which consists in reacting orthophenylphenol with an aqueous solution of sodium hydroxide, then while maintaining the reaction product below —5° C., adding phosgene thereto, collecting the solid material thus formed from the solution and reacting it with aluminum chloride.

2. A method as defined in claim 1, characterized by freezing the phosgene-treated solution and removing the water therefrom.

3. A method as defined in claim 1, characterized by conducting the reaction with aluminum chloride in solution, acidifying the solution resulting from the aluminum chloride reaction with dilute hydrochloric acid and recovering the solute by evaporation.

References Cited in the file of this patent

Rule et al.: J. Chem. Soc., p. 925 (1927).
Gilman et al.: Rec. Trav. Chem., vol. 52 (1933), pp. 389–394.